Patented Dec. 18, 1923.

1,478,039

UNITED STATES PATENT OFFICE.

LUCAS P. KYRIDES, OF BUFFALO, NEW YORK, ASSIGNOR TO NATIONAL ANILINE & CHEMICAL COMPANY, INC., OF NEW YORK, N. Y., A CORPORATION OF NEW YORK.

TRIARYLMETHANE DYES.

No Drawing.   Application filed October 21, 1922. Serial No. 596,135.

*To all whom it may concern:*

Be it known that I, LUCAS P. KYRIDES (whose name was changed by judicial decree from LUCAS P. KYRIAKIDES), a citizen of the United States, residing at Buffalo, in the county of Erie, State of New York, have invented certain new and useful Improvements in Triarylmethane Dyes; and I do hereby declare the following to be a full, clear, and exact description of the invention, such as will enable others skilled in the art to which it appertains to make and use the same.

This invention relates to the manufacture and production of new acid dyestuffs which belong to the triphenylmethane series and which are of value for dyeing, from an acid bath, silk and wool whereas they leave cotton and artificial silk substantially unstained. They are also capable of forming lakes. The invention includes also the dyed fabrics, or other material, dyed with the new dyestuffs.

The new dyestuffs can be obtained by condensation of N-hydroxyethyl derivatives of aromatic secondary amines with sulfonic acid derivatives of aromatic aldehydes and subsequent oxidation of the thus obtained leuco compounds. The new dyestuffs in the free state have the following probable formula:

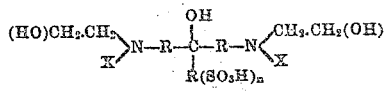

wherein R denotes an aryl group, X a hydrogen atom or an alkyl group or an aralkyl group which may or may not contain sulfo groups and $n$ a whole number whose value is 1 or 2.

The dyestuffs thus obtainable are probably in the form of their sodium salts and are powders of a metallic lustre, soluble in water generally with a greenish to bluish coloration, insoluble in ether and in ligroin, and soluble in concentrated sulfuric acid with a yellowish to reddish coloration. They dye silk or wool from an acid bath green to blue shades whereas they leave cotton or artificial silk practically unstained. By reduction with zinc and hydrochloric acid they are reduced to the corresponding leuco compounds.

The following specific example will illustrate the invention, but it is understood that the invention is not limited thereto. The parts are by weight.

Example: 90 parts of N-hydroxyethylbenzylaniline is heated with 52 parts of benzaldehyde-2.5-disulfonic acid and 1000 parts of water in a vessel provided with a reflux condenser for 30 hours at boiling temperature, the mixture being constantly stirred. When the condensation is complete, the reaction-product, which consists chiefly of the leuco compound, is filtered off and washed with water. The product is then suspended in 500 parts of water and, whilst stirring, sodium hydroxide solution is slowly added until the solution becomes slightly alkaline in reaction and the leuco compound has dissolved. The solution is then filtered and the filtrate extracted once or twice with benzene in order to remove any N-hydroxyethylbenzylaniline which may be present. The leuco compound is then precipitated from the aqueous solution by the addition of dilute sulfuric acid, and is filtered off and washed. The leuco compound may be converted into the dyestuff by oxidation in the following manner: 68.4 parts of this leuco compound are dissolved in 900 parts of water containing sufficient sodium hydroxide to effect solution and render it slightly alkaline toward phenolphthalein as indicator. 40 parts of lead peroxide of 60.34 per cent purity and 1000 parts of water are then added to the well-stirred solution, and then 50 parts of glacial acetic acid. After stirring for about 20-25 minutes, 40 parts anhydrous sodium sulfate are added, and the stirring continued for about 10 minutes longer. The lead sulfate is then filtered off and the dyestuff salted out from the filtrate by the addition of common salt. It is filtered off, washed and dried. In the dry and powdered state, it is a blue powder with a reddish tinge, easily soluble in water or in alcohol with a greenish-blue coloration, and soluble in concentrated sulfuric acid with a yellowish coloration which upon gradual dilution with ice or ice-water changes in color to orange, reddish-brown, yellowish-green, and finally to a greenish blue. The new dyestuff has most probably the following formula:

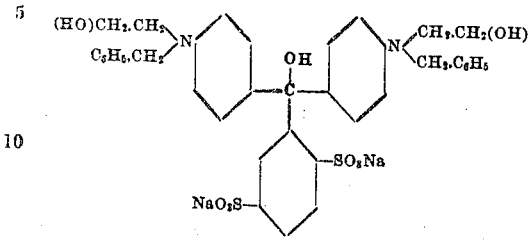

and dyes from an acid bath a greenish-blue on silk or wool, and yields by reduction with zinc and hydrochloric acid the corresponding colorless leuco compound whose sodium salt has the following probable formula:

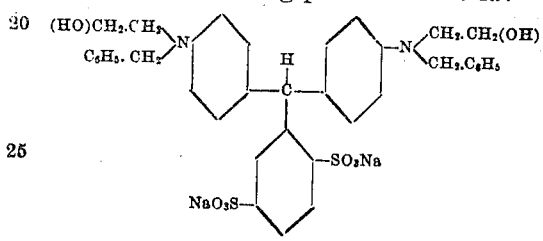

In an analogous manner dyestuffs with similar properties result from the following components on the one hand, namely, N-hydroxyethylmethylaniline, N-hydroxyethylethylaniline, N-hydroxyethylorthotoluidine, N-hydroxyethylmetatoluidine, N-hydroxyethylbenzyltoluidine, N-hydroxyethylbenzylaniline-sulfonic acid, etc., and on the other hand benzaldehyde-1-sulfonic acid, benzaldehyde-4-sulfonic acid, benzaldehyde-2.4-disulfonic acid, 5-methylbenzaldehyde-2.-4-disulfonic acid, etc. The dyed materials produced by the action of the dyestuffs themselves or lakes thereof on the fibre or fabric, as well as the new dyestuffs themselves or lakes thereof, form a part of the present invention.

I claim:

1. The new acid dyestuffs comprising products obtainable by condensation of aromatic aldehyde sulfonic acids with N-hydroxyethyl derivatives of aromatic secondary amines and subsequent oxidation, and having the following probable general formula:

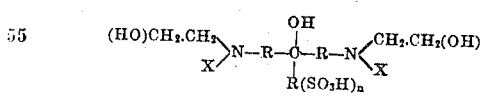

wherein R denotes an aryl group, X a hydrogen atom which may be substituted by an organic hydrocarbon radical which may contain a sulfo group, and $n$ a number not greater than 2; said dyestuffs being powders of a metallic lustre, soluble in water generally with a greenish to bluish coloration, insoluble in ether and in ligroin, soluble in concentrated sulfuric acid generally with a yellowish to reddish coloration; yielding upon reduction with zinc and hydrochloric acid the corresponding leuco compounds; and dyeing green to blue shades on silk and on wool from an acid bath whereas cotton is left substantially unstained.

2. The new acid dyestuffs comprising products obtainable by condensation of aromatic aldehyde sulfonic acids having a sulfo group in the ortho position to the aldehyde group with N-hydroxyethyl derivatives of aromatic secondary amines and subsequent oxidation, and having the following probable formula:

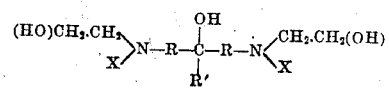

wherein R denotes an aryl group, X a hydrogen atom which may be substituted by an organic hydrocarbon radical which may contain a sulfo group, and R' an aromatic nucleus substituted by at least one and not more than two sulfo groups and having at least one of said sulfo groups in the ortho position to the carbon atom which is attached to the central carbinol carbon atom; said dyestuffs being powders of a metallic lustre, soluble in water generally with a greenish to bluish coloration, insoluble in ether and in ligroin, soluble in concentrated sulfuric acid generally with a yellowish to reddish coloration; yielding upon reduction with zinc and hydrochloric acid the corresponding leuco compounds; and dyeing greenish-blue to blue shades on wool and on silk from an acid bath whereas cotton is left almost untinged.

3. The new acid dyestuffs comprising products obtainable by condensation of benzaldehyde-2.5-disulfonic acid with N-hydroxyethyl derivatives of aromatic secondary amines and subsequent oxidation, and having the following probable formula:

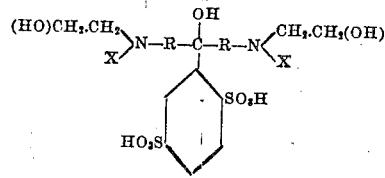

wherein R denotes an aryl group and X a hydrogen atom which may be substituted by an organic hydrocarbon radical which may contain a sulfo group; said dyestuffs being powders of a metallic lustre, soluble in water generally with a greenish to bluish coloration, insoluble in ether and in ligroin, soluble in concentrated sulfuric acid generally with a yellowish to reddish coloration; yielding upon reduction with zinc and hydrochloric acid the corresponding leuco compounds; and dyeing silk and wool greenish-blue to blue shades from an acid bath whereas cotton is left practically unstained.

4. The new acid dyestuff comprising a product obtainable by condensation of benzaldehyde-2.5-disulfonic acid with N-hydroxyethylbenzylaniline and subsequent oxidation, and having the following probable formula:

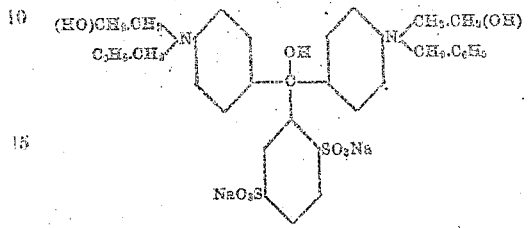

said dyestuff being a blue powder with a reddish metallic lustre, soluble in water and in alcohol with a greenish blue coloration, insoluble in ether and in ligroin, soluble in concentrated sulfuric acid with a yellowish coloration which solution upon gradual dilution with ice-water changes to yellowish-red, reddish-brown, yellowish-green and finally to a greenish-blue coloration, the dyestuff remaining in solution; yielding upon reduction with zinc and hydrochloric acid the corresponding colorless leuco compound; and dyeing from an acid bath a blue shade on silk and on wool whereas cotton is left substantially unstained.

5. Materials dyed with the new dyestuffs of claim 1.

6. Materials dyed with the new dyestuffs of claim 2.

7. Materials dyed with the new dyestuffs of claim 3.

8. Materials dyed with the new dyestuff of claim 4.

In testimony whereof I affix my signature.

LUCAS P. KYRIDES.